(12) United States Patent
Okai

(10) Patent No.: US 7,871,136 B2
(45) Date of Patent: Jan. 18, 2011

(54) TROUBLE DIAGNOSIS DEVICE OF VEHICLE BODY ACCELERATION SENSOR AND ANTILOCK-BRAKE SYSTEM

(75) Inventor: Takayuki Okai, Yokosuka (JP)

(73) Assignee: Bosch Corporation, Tokyo (JP)

( * ) Notice: Subject to any disclaimer, the term of this patent is extended or adjusted under 35 U.S.C. 154(b) by 950 days.

(21) Appl. No.: 10/583,818

(22) PCT Filed: Dec. 27, 2004

(86) PCT No.: PCT/JP2004/019544

§ 371 (c)(1),
(2), (4) Date: Apr. 12, 2007

(87) PCT Pub. No.: WO2005/064350

PCT Pub. Date: Jul. 14, 2005

(65) Prior Publication Data

US 2008/0041135 A1 Feb. 21, 2008

(30) Foreign Application Priority Data

Dec. 26, 2003 (JP) .............................. 2003-434276

(51) Int. Cl.
*B60T 8/88* (2006.01)
(52) U.S. Cl. ............. 303/122.05; 303/122; 303/122.08; 701/34; 701/76; 73/511
(58) Field of Classification Search ............ 303/122.08, 303/122.02, 122.05, 122; 701/34, 76, 70; 73/511
See application file for complete search history.

(56) References Cited

U.S. PATENT DOCUMENTS

| 5,203,821 | A | * | 4/1993 | Tanaka | 73/1.38 |
| 5,212,640 | A | * | 5/1993 | Matsuda | 701/34 |
| 5,265,472 | A | * | 11/1993 | Pfeifle et al. | 73/514.02 |
| 6,276,188 | B1 | * | 8/2001 | Horiuchi | 73/1.37 |
| 6,285,933 | B1 | * | 9/2001 | Kohler et al. | 701/34 |
| 6,305,760 | B1 | * | 10/2001 | Otake | 303/122.05 |
| 6,682,153 | B2 | * | 1/2004 | Okai | 303/122.05 |
| 2003/0038537 | A1 | | 2/2003 | Okai | |

FOREIGN PATENT DOCUMENTS

GB 2368400 A * 5/2002

(Continued)

*Primary Examiner*—Robert A Siconolfi
*Assistant Examiner*—Mariano Sy
(74) *Attorney, Agent, or Firm*—Priest & Goldstein, PLLC

(57) ABSTRACT

A trouble diagnosis device of a vehicle body acceleration sensor by determining that the output fixing trouble of the vehicle body acceleration sensor or the like is not generated at a point of time that the fluctuation width of the output value of a vehicle body acceleration sensor becomes a predetermined value or above during the traveling of the vehicle with the vehicle speed equal to or more than the predetermined speed, and by stopping the trouble diagnosis of the output fixing trouble of the vehicle body acceleration sensor or the like until the vehicle speed is lowered to a value less than the predetermined speed thereafter, it is possible to avoid the trouble diagnosis of the output fixing trouble of the vehicle body acceleration sensor or the like when that the trouble diagnosis of the output fixing trouble of the vehicle body acceleration sensor or the like is unnecessary.

6 Claims, 11 Drawing Sheets

FOREIGN PATENT DOCUMENTS

| | | | |
|---|---|---|---|
| JP | 1-195168 | | 8/1989 |
| JP | 04110239 A | * | 4/1992 |
| JP | 04110267 A | * | 4/1992 |
| JP | 04313062 A | * | 11/1992 |
| JP | 8-184610 | | 7/1996 |
| JP | 2003-63375 | | 3/2003 |

* cited by examiner

[Fig. 1]
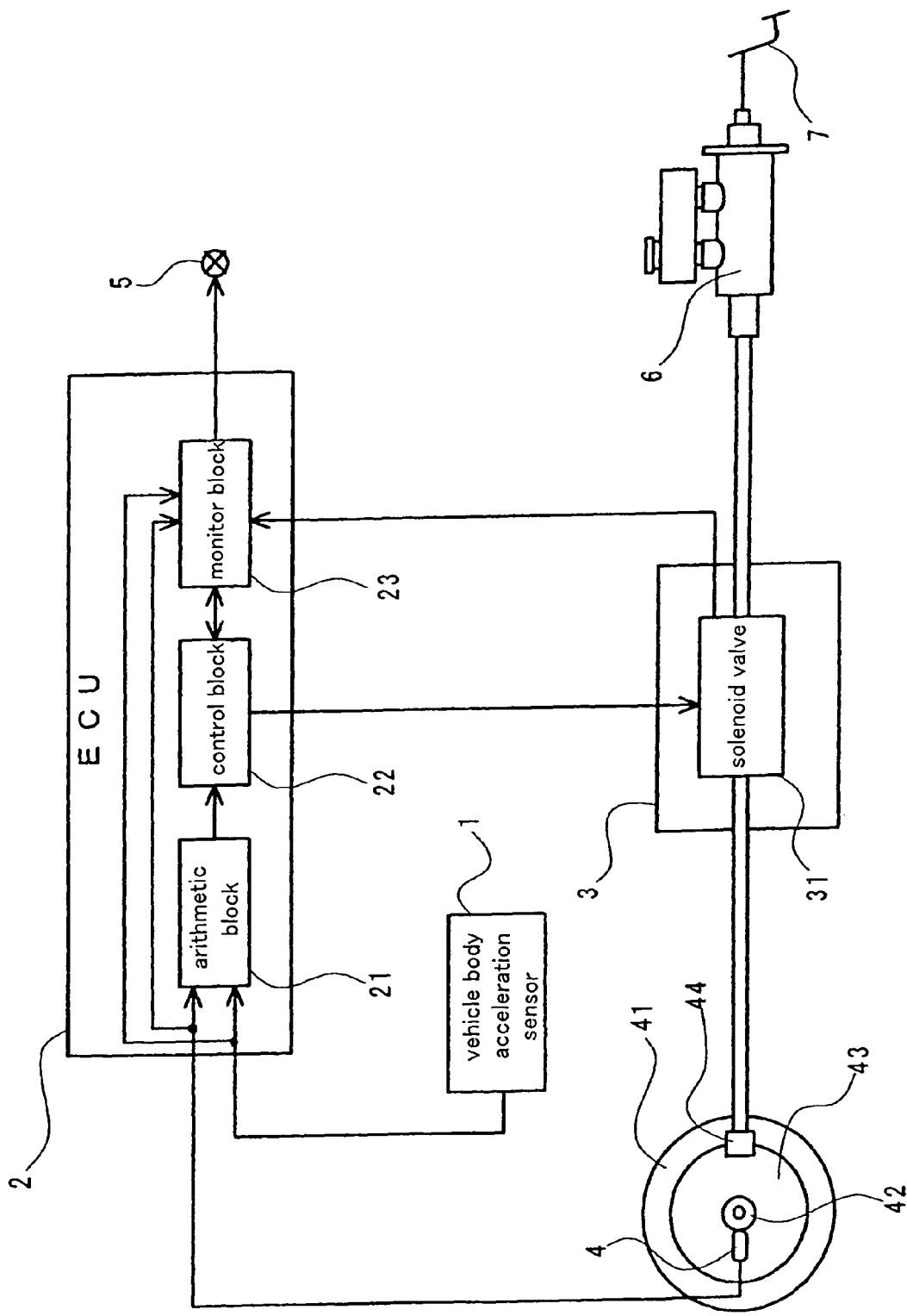

[Fig.2]
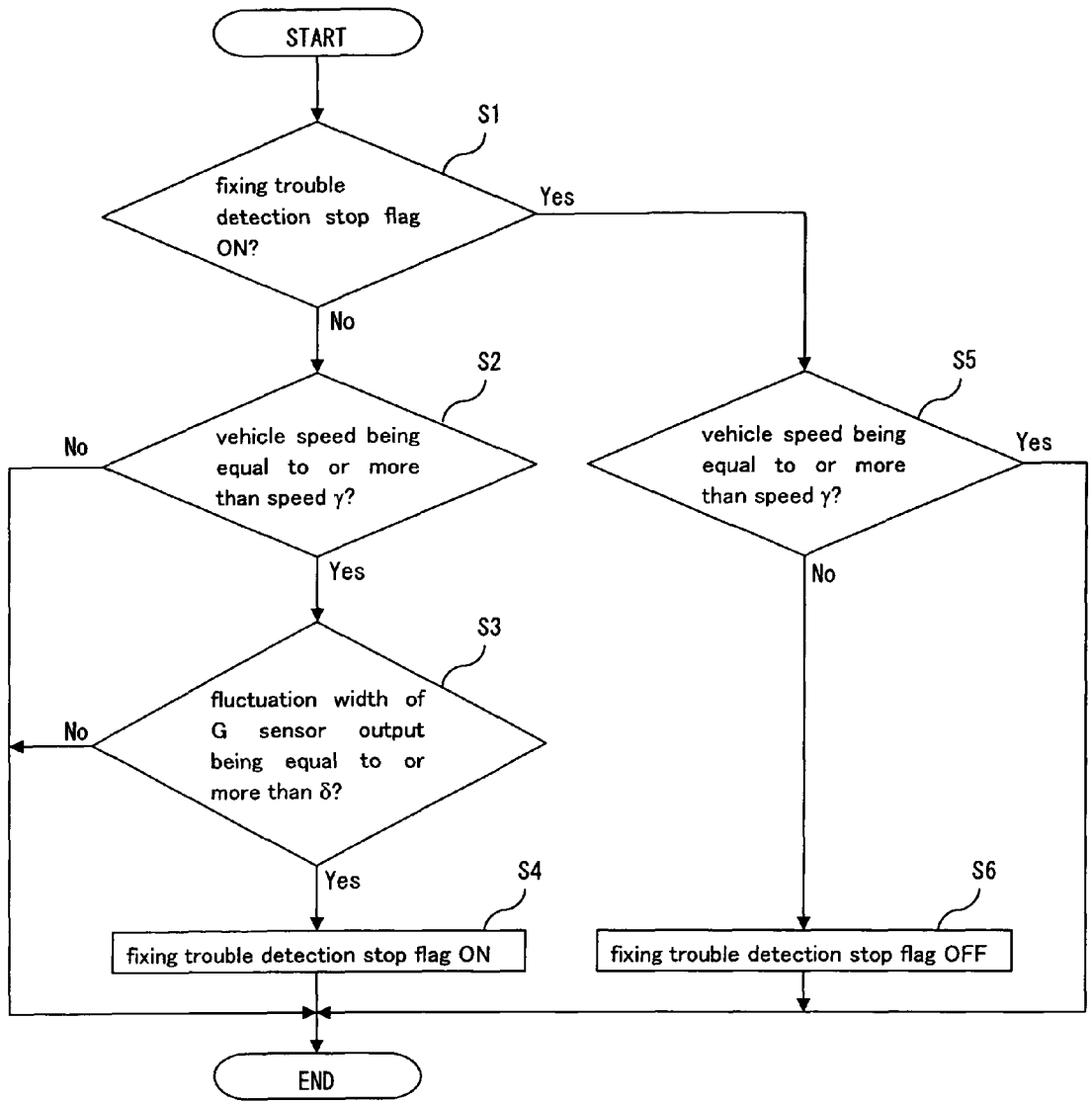

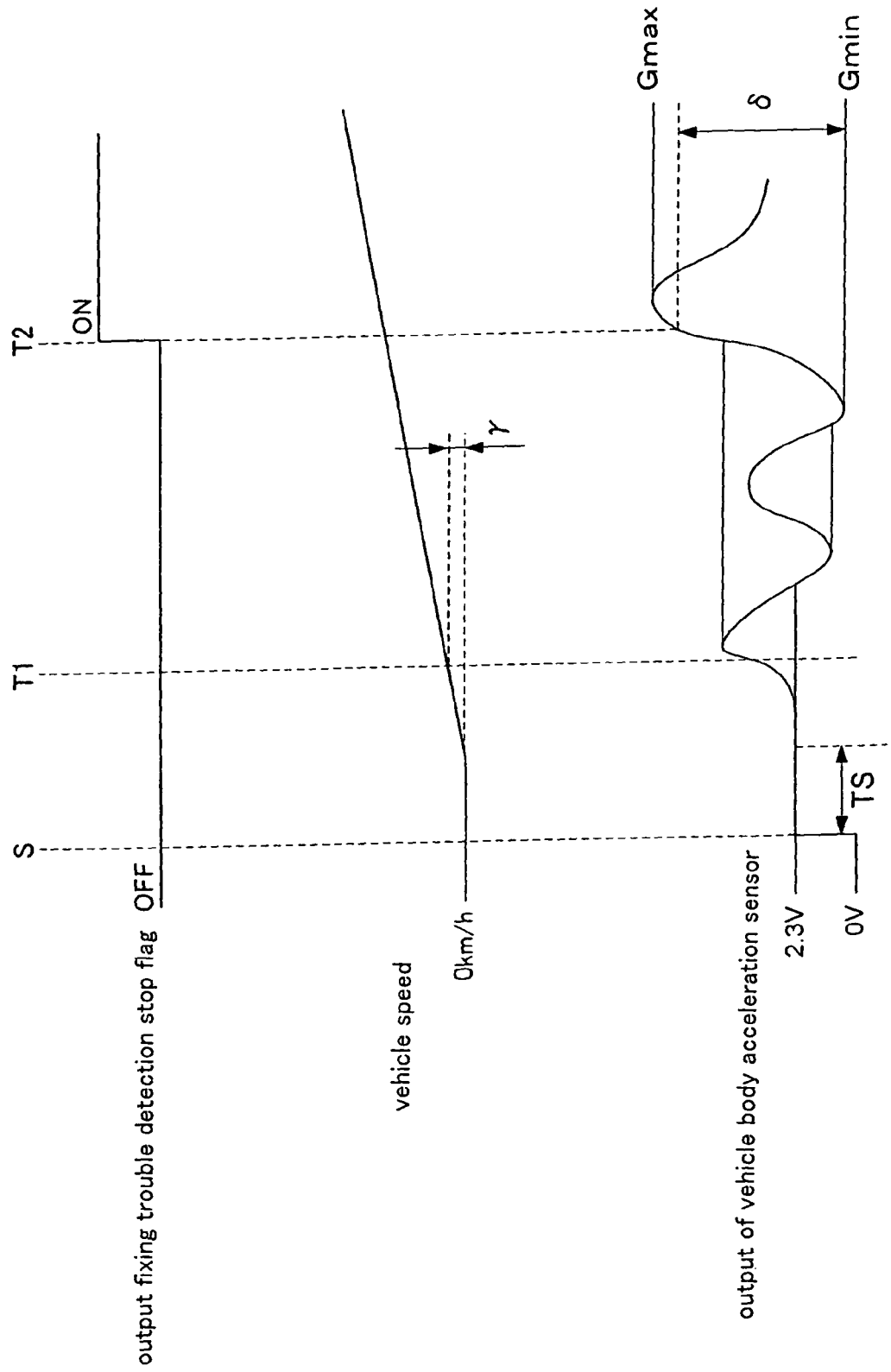
[Fig. 3]

[Fig. 4]
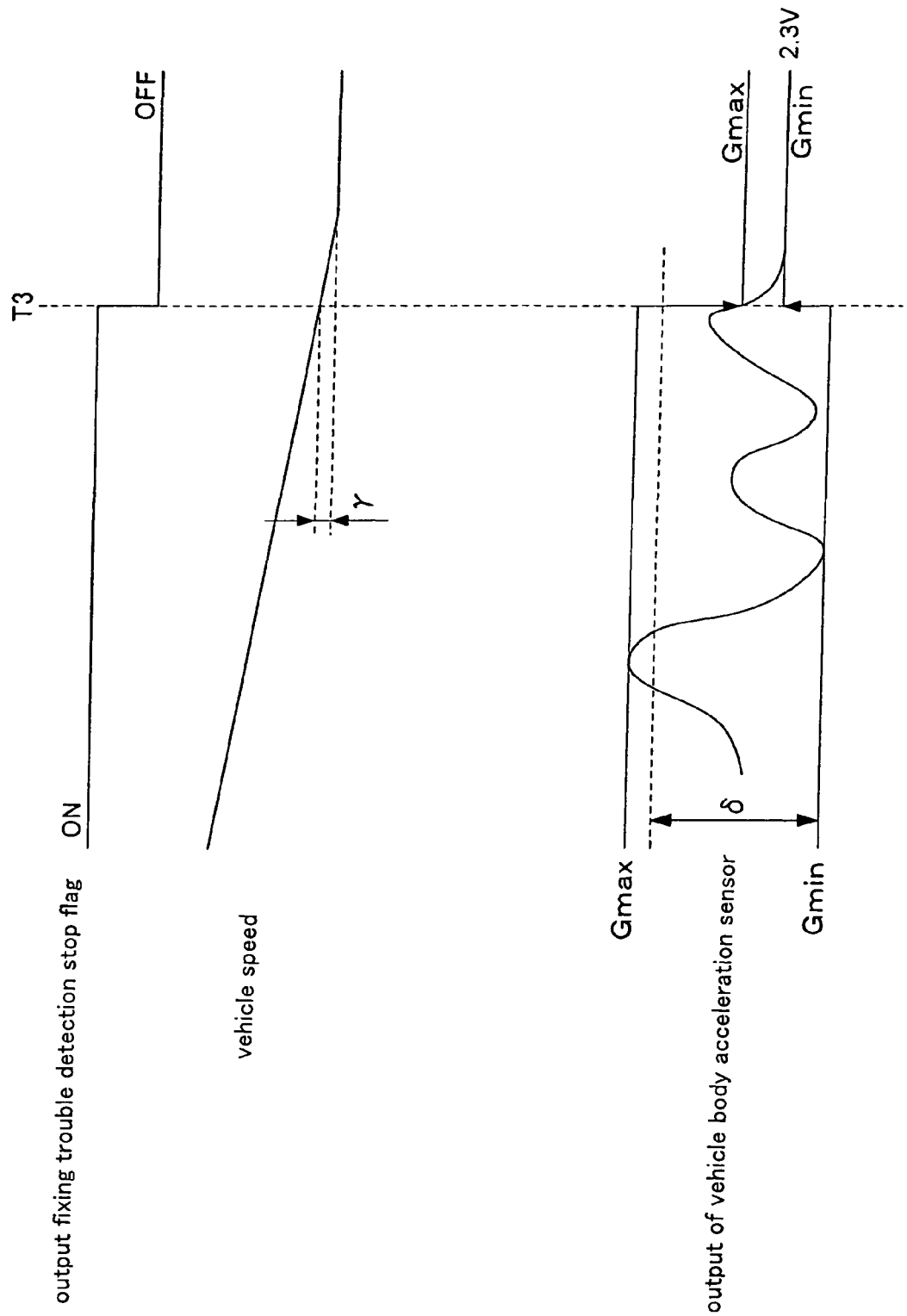

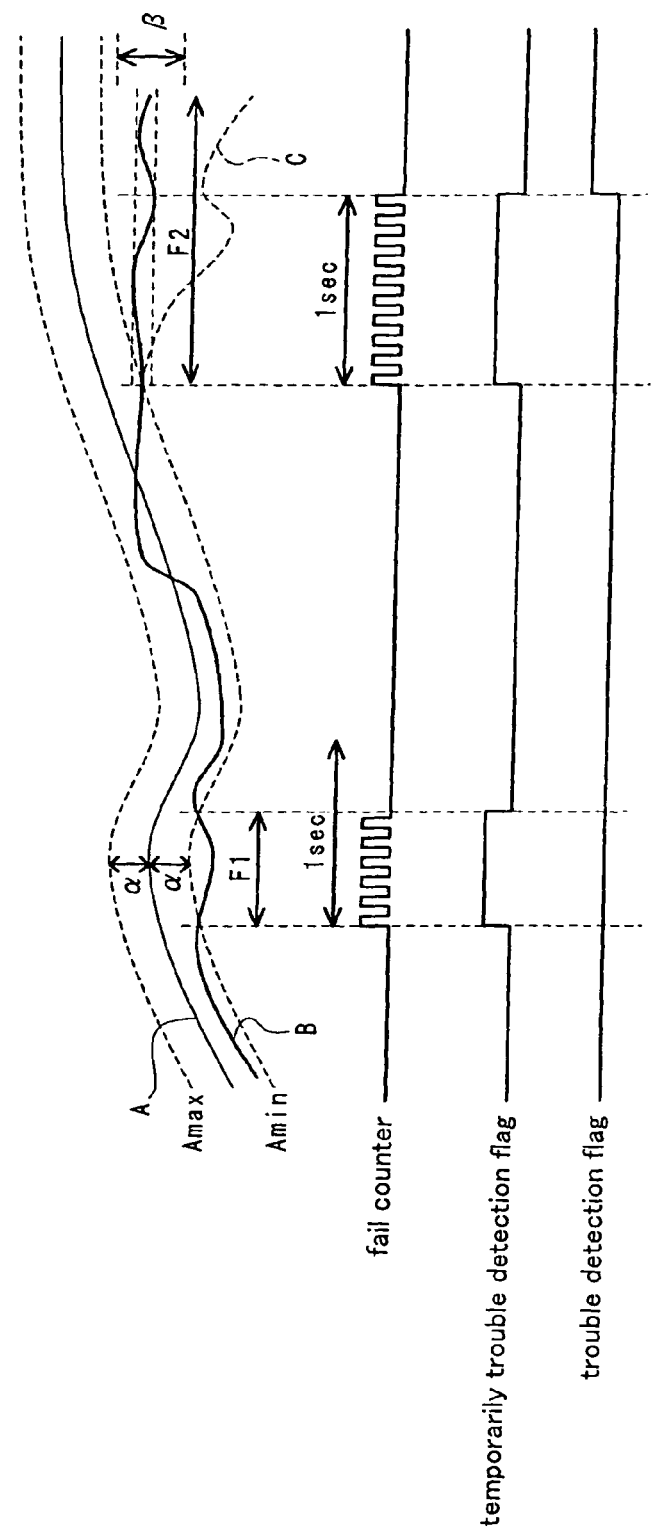
[Fig. 5]

[Fig.6]
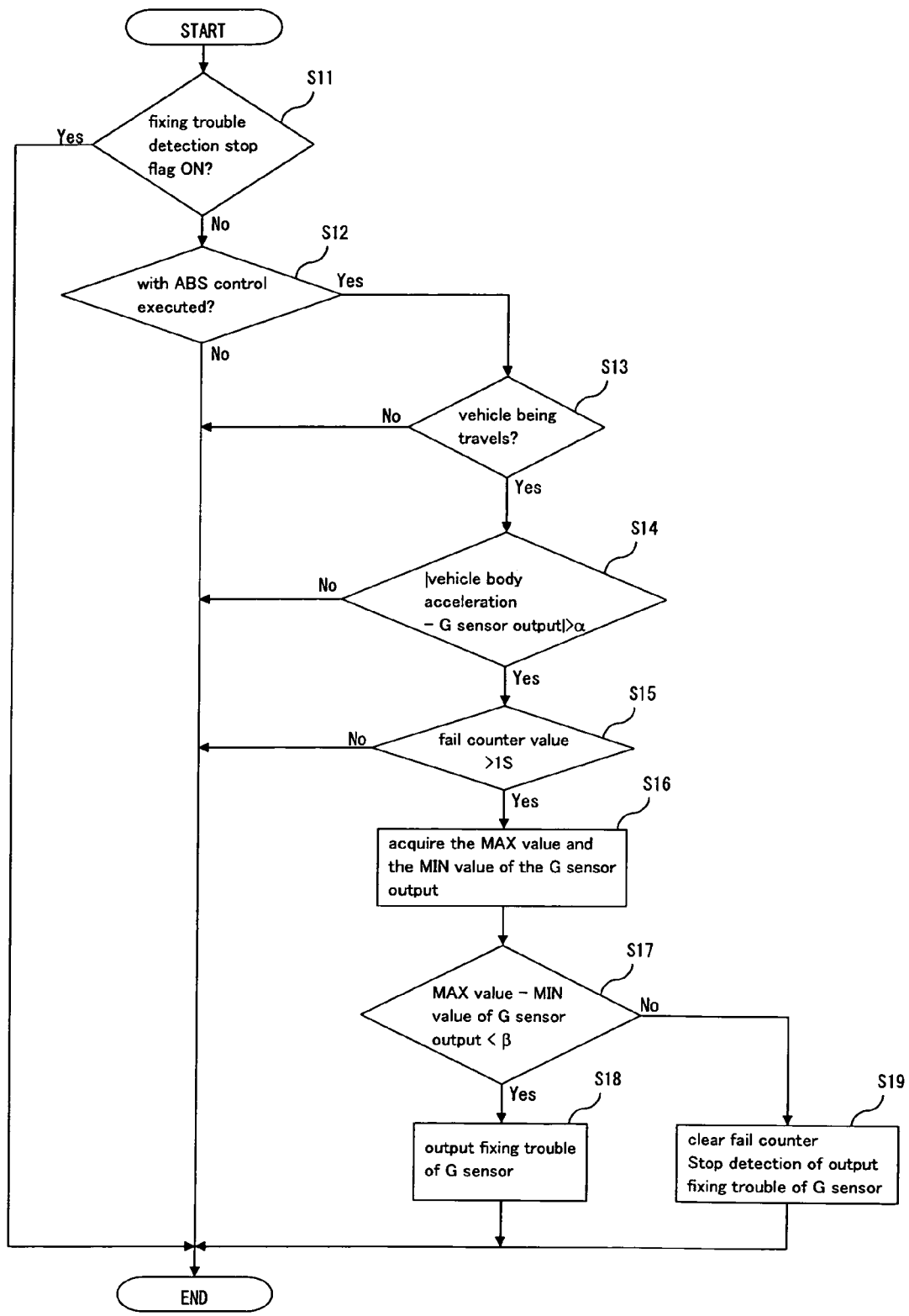

[Fig.7]
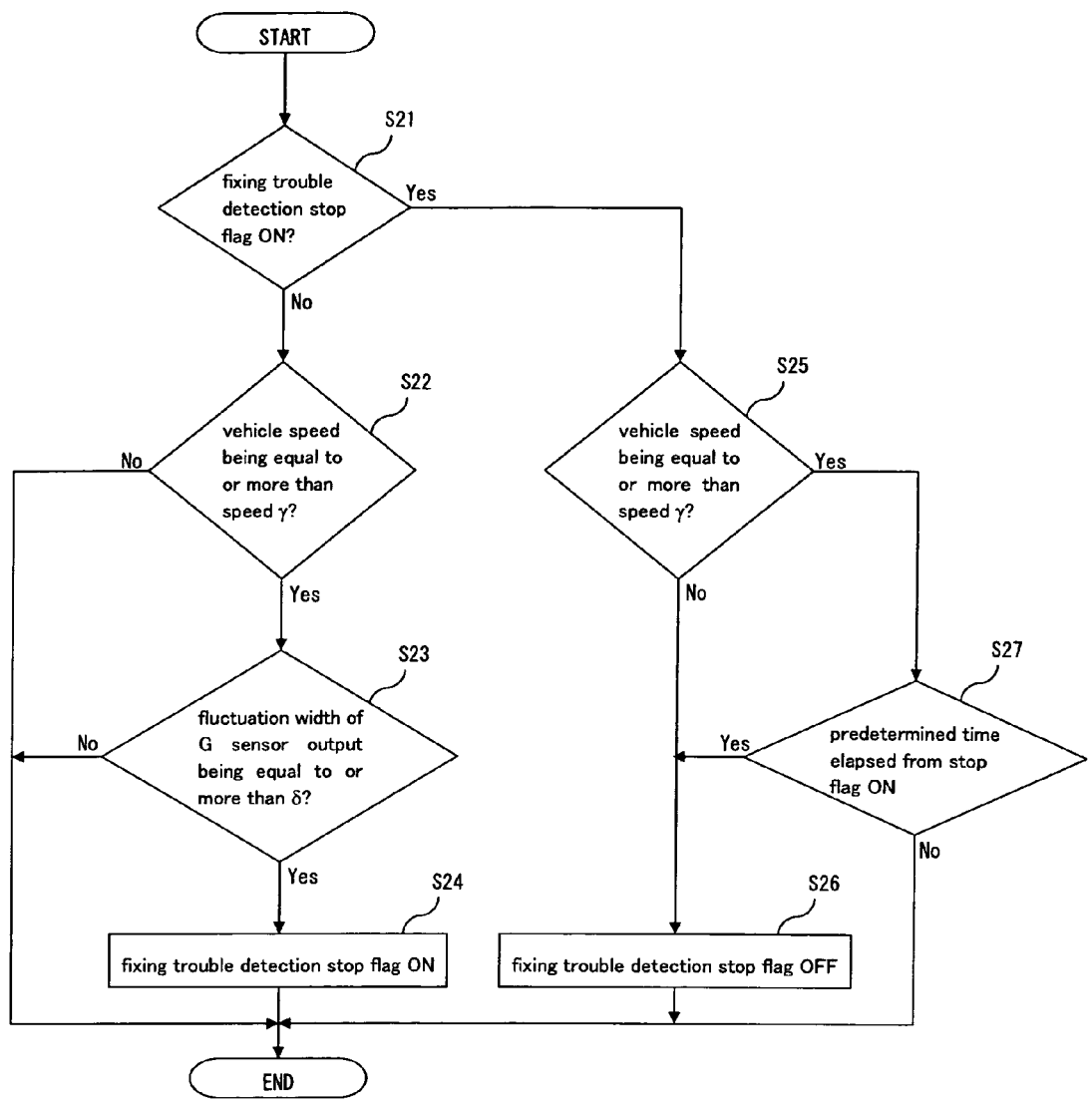

[Fig. 8]
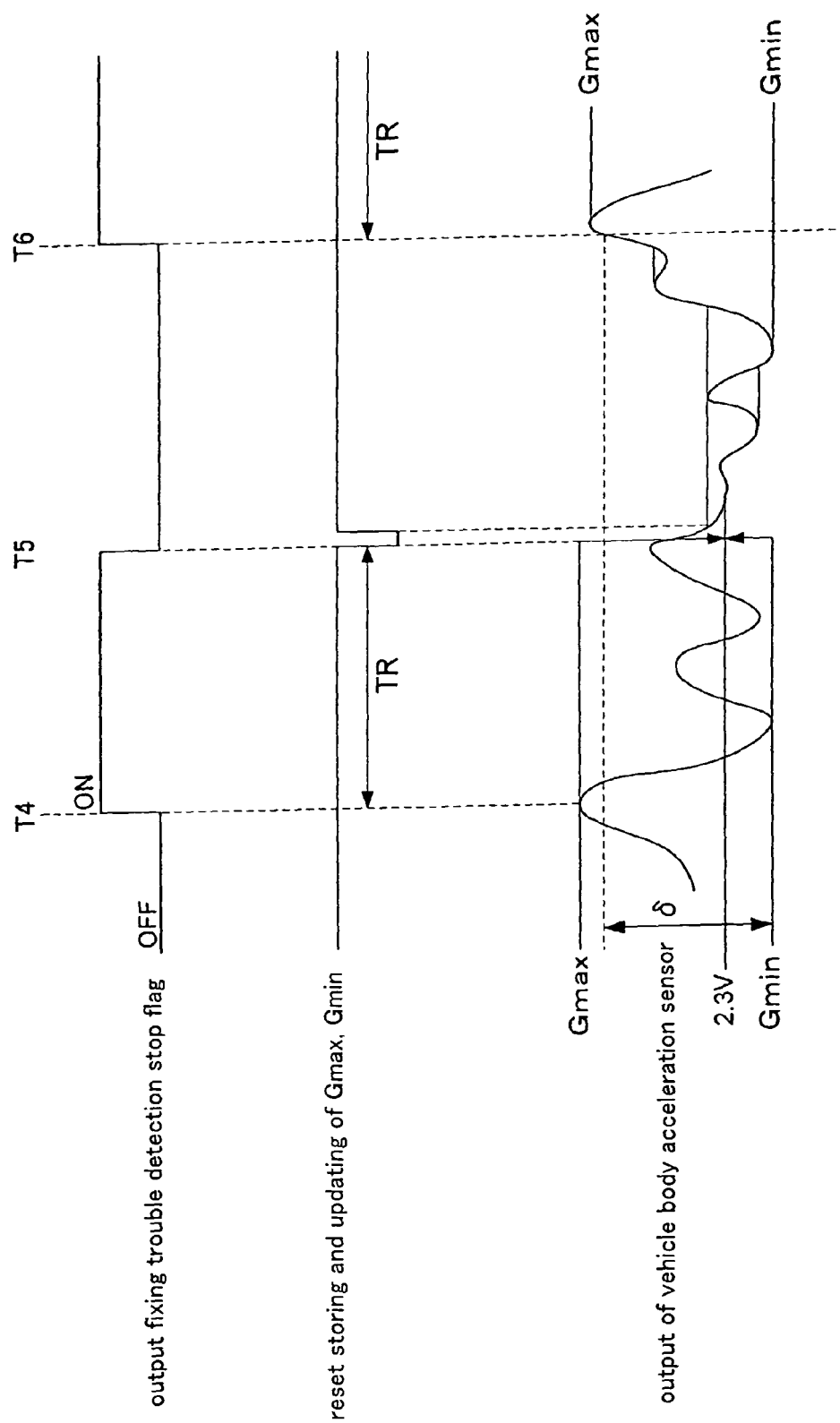

[Fig.9]
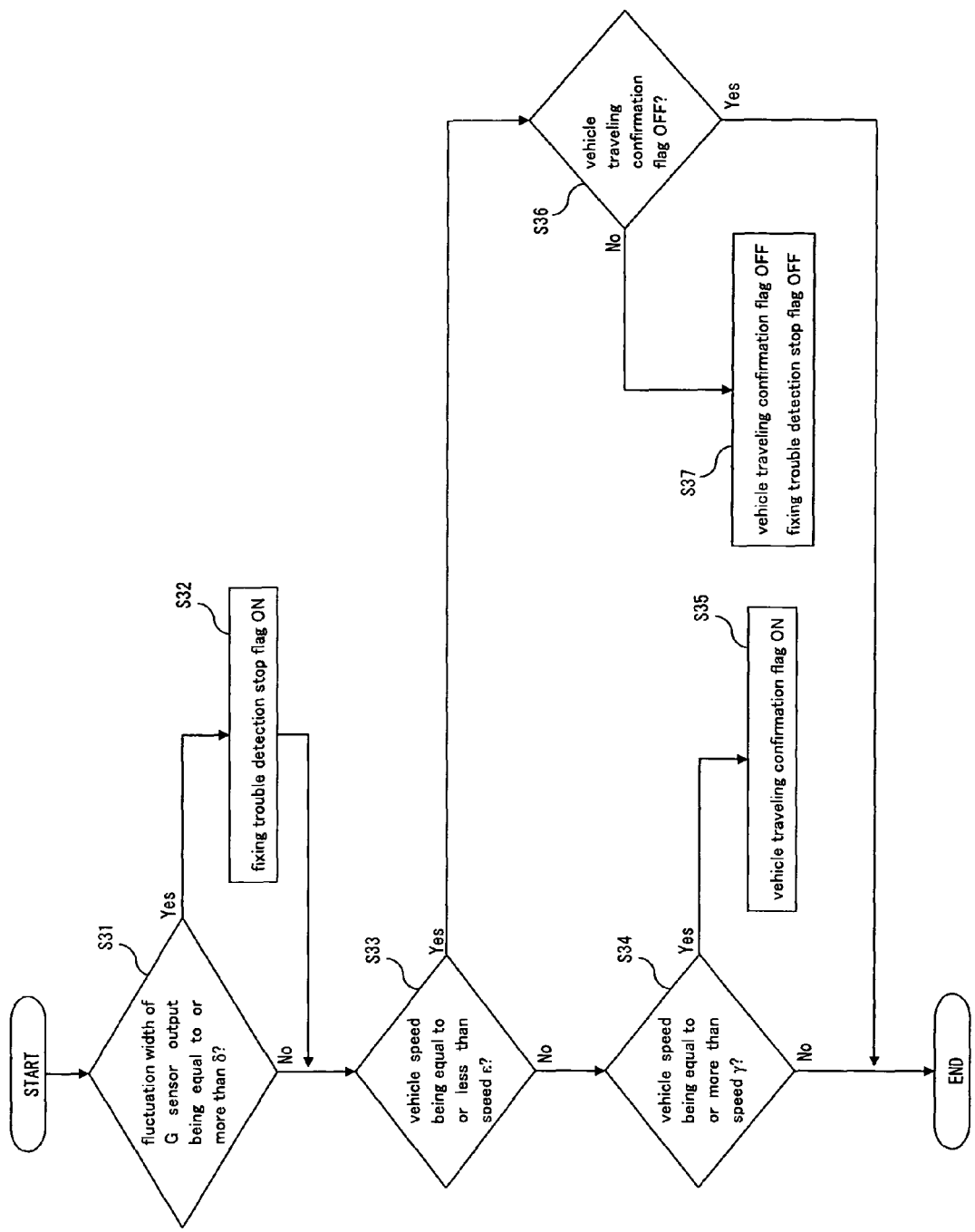

[Fig. 10]
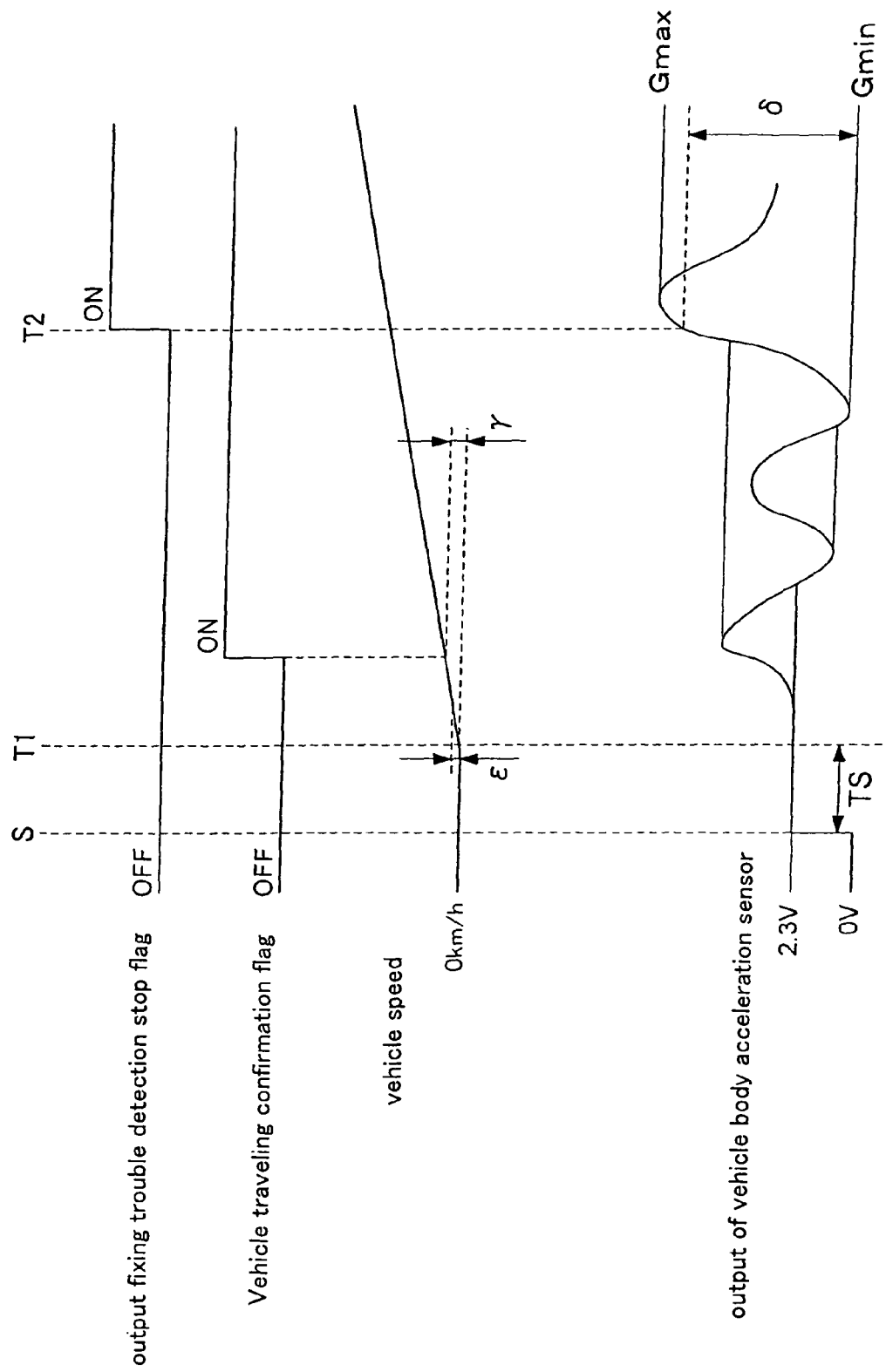

[Fig. 11]
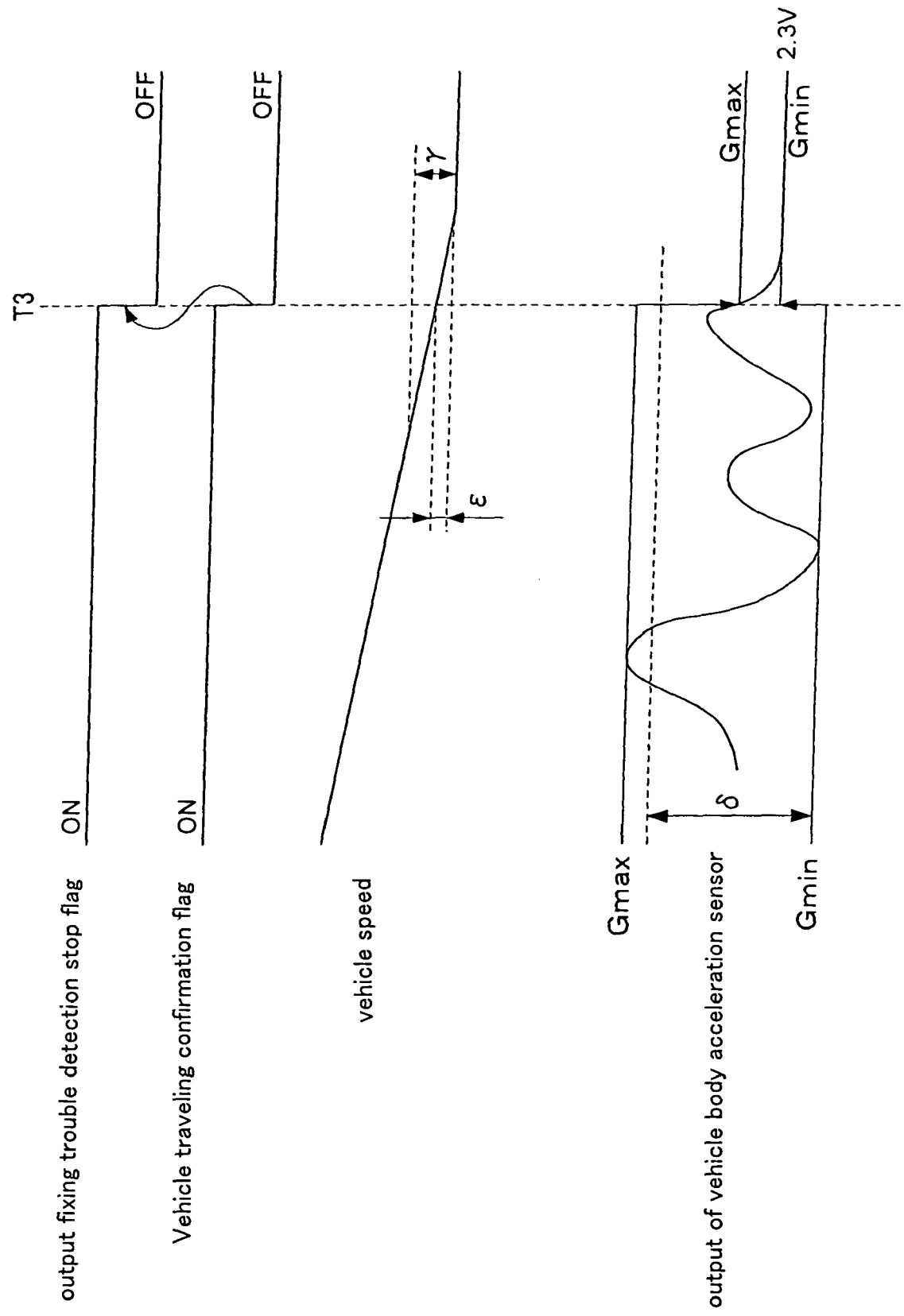

TROUBLE DIAGNOSIS DEVICE OF VEHICLE BODY ACCELERATION SENSOR AND ANTILOCK-BRAKE SYSTEM

TECHNICAL FIELD

The present invention relates to a trouble diagnosis device of a vehicle body acceleration sensor which performs a trouble diagnosis of a sensor which is mounted on a vehicle and is changed in response to a traveling state of a vehicle during traveling of the vehicle, particularly, a vehicle body acceleration sensor for detecting the vehicle body acceleration of a vehicle, and an antilock brake system which includes a trouble diagnosis device of a vehicle body acceleration sensor.

BACKGROUND ART

A wheel deceleration speed which is necessary for controlling an antilock brake system (hereinafter referred to as ABS) is easily obtainable with respect to a two-wheel drive automobile having non-driven wheels. However, in a four-wheel drive automobile, when a center differential and a rear-wheel shaft differential are locked and four wheels are directly connected with each other, all wheels are connected to an engine having a large moment of inertia and hence, a response speed of wheels for a change of a brake torque is remarkably lowered. Accordingly, it is hardly possible to obtain a wheel deceleration signal and hence, the wheel is locked. As one of means to overcome such a drawback, in general, a vehicle body acceleration sensor is mounted on the four-wheel drive automobile. The vehicle body acceleration in the advancing direction of the vehicle body is measured by such a vehicle body acceleration sensor and when the deceleration at the time of braking is smaller than a fixed value, a road surface is determined as a road surface having a low friction resistance value μ (hereinafter referred to as "low μ road surface"). Then, by changing over a control logic from a slip control logic for road surface having high friction resistance value μ (hereinafter referred to as "high μ road surface") to a slip control logic for low μ road surface, the control accuracy is increased and hence, the locking of the wheel is prevented. Accordingly, the vehicle body acceleration sensor is indispensable particularly in the ABS of the four-wheel drive automobile and hence, when the vehicle body acceleration sensor is in trouble, the slip control becomes impossible and the wheel may be locked. In such circumstances, the detection of trouble of the vehicle body acceleration sensor is surely indispensable. Although several trouble modes are considered as the trouble mode of the vehicle body acceleration sensor, as one of such trouble modes, there has been known an output fixing trouble in which the outputting of a fixed vehicle body acceleration signal is maintained so that a vehicle body acceleration output signal is not changed in accordance with the acceleration of the vehicle body.

As one example of the related art which detects the output fixing trouble of the vehicle body acceleration sensor, there has been known a technique in which in a state that an antilock brake control is not performed, a vehicle body acceleration which is calculated based on a wheel speed sensor and a vehicle body acceleration which is detected by the vehicle body acceleration sensor are compared to each other, and when the difference between these vehicle body accelerations is equal to or more than a predetermined value, it is determined that the vehicle body acceleration sensor is in the output fixing trouble (see patent document 1, for example) Alternatively, there has been known a technique in which a vehicle body acceleration which acts on a vehicle body due to gravity which can be estimated when an automobile ascends or descends a slope having a sufficiently large inclination angle is set as a threshold value, and when a vehicle body acceleration which is calculated by a wheel speed sensor is larger than the threshold value and a vehicle body acceleration which is calculated by a vehicle body acceleration sensor is smaller than the threshold value, it is determined that the vehicle body acceleration sensor is in the output fixing trouble (for example, see patent document 2). Further, there has been known a technique in which a relative acceleration difference between a logic vehicle body acceleration which is calculated based on a wheel speed and a physical vehicle body acceleration which a vehicle body acceleration sensor detects is calculated, a continuation time in which the acceleration difference exceeds a preset value is measured, a minimum acceleration and a maximum acceleration of the physical vehicle body acceleration are stored during a state in which the acceleration difference exceeds the preset value, and at a point of time that the continuation time of the state in which the acceleration difference exceeds the preset value exceeds the preset time, when the difference between the stored minimum acceleration and the maximum acceleration is a value equal to or less than a fixed difference, it is determined that the vehicle body acceleration sensor is in the output fixing trouble (for example, see patent document 3).

Patent Document 1: JP-A-1-195168
Patent Document 2: JP-A-8-184610
Patent Document 3: JP-A-2003-63375

DISCLOSURE OF THE INVENTION

A vehicle ABS of an automobile in general includes a vehicle control device which is referred to as an ECU (an electronic control unit). The ECU possesses an arithmetic function of calculating a wheel speed based on an AC signal which is transmitted from a wheel speed sensor and is inputted thereto and calculates a slip ratio and wheel acceleration/deceleration based on the wheel speed, a control function of generating an antilock brake control command for a brake pressure by logically combining the calculated slip ratio and the wheel acceleration/deceleration and transmitting the control command to a liquid pressure unit, and a system monitoring function of performing a function check and monitoring of respective constitutional parts and the whole system and, when a defect occurs with respect to the constitutional part or the whole system, alarming the occurrence of the defect to a driver using an alarm lamp, an alarm buzzer or the like and stopping an antilock brake control function and, at the same time, enabling a normal brake operation, wherein the detection of the outputting fixing trouble of the vehicle body acceleration sensor or the like is also executed by the ECU. During the traveling of the automobile, the ECU always has to execute various arithmetic operations based on various vehicle state information and various control processing such as an antilock brake control based on the arithmetic operations and hence, the constant execution of the detection of the output fixing trouble of the vehicle body acceleration sensor during the traveling of the automobile brings about the increase of a control processing load of the ECU and, depending on a traveling state of the automobile, there exists a possibility that a delay is generated in the arithmetic processing, the control processing and the like of the ECU so that the ECU cannot obtain the desired antilock brake control function.

The present invention has been made under such circumstances and it is an object of the present invention to reduce a control processing load of a vehicle-use antilock brake system by performing a diagnosis of a trouble of a sensor which is mounted on a vehicle and whose output is changed in response to a traveling state of the vehicle during the traveling of the vehicle, and particularly to a vehicle body acceleration sensor which detects vehicle body acceleration of the vehicle.

To achieve the above-mentioned object, according to a first aspect of the present invention, there is provided a trouble diagnosis device of a vehicle body acceleration sensor which performs a trouble diagnosis of a vehicle body acceleration sensor based on the vehicle body acceleration sensor which is mounted on a vehicle, a vehicle-speed detection means which detects a speed of the vehicle, and a vehicle body acceleration sensor output fluctuation width arithmetic means which calculates an output fluctuation width of the vehicle body acceleration sensor, wherein the trouble diagnosis device is operated until the vehicle speed which is detected by the vehicle speed detection means is equal to or more than a predetermined speed and the output fluctuation width of the vehicle body acceleration sensor which is calculated by the vehicle body acceleration sensor output fluctuation width arithmetic means becomes a predetermined value or more.

The trouble diagnosis of the output fixing trouble of the vehicle body acceleration sensor is performed by estimating, when a state that an output signal of the vehicle body acceleration sensor is hardly changed continues, whether such a state is brought about by the output fixing trouble of the output signal of the vehicle body acceleration sensor or the substantially no change of a state of an object to be detected based on other state information of the vehicle or the like. Accordingly, when a fluctuation width of the vehicle body acceleration sensor is fluctuated with a predetermined value or more during traveling of a vehicle with a vehicle speed equal to or more than a predetermined speed or more, this implies that at least the output fixing trouble of the vehicle body acceleration sensor is not generated and it is understood that the trouble diagnosis of the output fixing trouble of the vehicle body acceleration sensor is unnecessary.

Accordingly, by determining that the output fixing trouble of the vehicle body acceleration sensor or the like is not generated at a point of time that the fluctuation width of the output value of the vehicle body acceleration sensor becomes the predetermined value or above during the traveling of the vehicle with the vehicle speed equal to or more than the predetermined speed, and by stopping the trouble diagnosis of the output fixing trouble of the vehicle body acceleration sensor or the like until the vehicle speed is lowered to a value less than the predetermined speed thereafter, it is possible to avoid the trouble diagnosis of the output fixing trouble of the vehicle body acceleration sensor or the like in a state that the trouble diagnosis of the output fixing trouble of the vehicle body acceleration sensor or the like is unnecessary.

Accordingly, it is possible to perform the trouble diagnosis of the output fixing trouble of the vehicle body acceleration sensor or the like only in a state that the trouble diagnosis of the output fixing trouble of the vehicle body acceleration sensor or the like is necessary during the traveling of the vehicle and hence, the trouble diagnosis of the output fixing trouble of the vehicle body acceleration sensor or the like is not always performed during the traveling of the vehicle whereby it is possible to obtain the manner of operation and advantageous effect that a control processing load of the vehicle antilock brake system during the traveling of the vehicle can be largely reduced.

Here, the predetermined speed is preferably set to a value as small as possible. By setting such a predetermined speed, when the output fixing trouble of the vehicle body acceleration sensor or the like occurs, it is possible to detect the output fixing trouble immediately after the vehicle starts the traveling. Further, it is preferable that the predetermined value of the output fluctuation width of the vehicle body acceleration sensor is set to a fluctuation width which is sufficiently larger than the fluctuation of an output value attributed to the voltage fluctuation of a power source voltage of the vehicle body acceleration sensor and, at the same time, is set to a fluctuation width as small as possible. By setting such a predetermined value of the output fluctuation width of the vehicle body acceleration sensor to such a value, there is no possibility that the output fixing trouble of the vehicle body acceleration sensor is overlooked and, at the same time, time for executing the trouble diagnosis of the output fixing trouble of the vehicle body acceleration sensor during the traveling can be shortened to a minimum.

According to a second aspect of the present invention, the trouble diagnosis device further includes a timer means and hence, when a state that the vehicle speed is equal to or more than the predetermined speed continues for a long time, it is possible to perform the trouble diagnosis of the output fixing trouble detection of the vehicle body acceleration sensor or the like periodically at a predetermined interval.

According to a third aspect of the present invention, the trouble diagnosis device includes a memory updating means, while according to a fourth aspect of the present invention, by resetting the memory updating means, the fluctuation width of the output value of the vehicle body acceleration sensor is newly measured from a point of time that the vehicle speed becomes the predetermined speed or more again, and the trouble diagnosis of the output fixing trouble of the vehicle body acceleration sensor or the like is performed during a period from the point of time to a point of time that the output fluctuation width of the vehicle body acceleration sensor becomes the predetermined value or more.

According to a fifth aspect of the present invention, the trouble diagnosis device includes a vehicle acceleration arithmetic means and a comparison measuring means. When the vehicle body acceleration sensor is in output fixing trouble, there is no possibility that the vehicle body acceleration which the vehicle body acceleration sensor outputs is fluctuated, while when a vehicle ascends or descends a slope having a large inclination with the vehicle body acceleration sensor in a normal state, the vehicle body acceleration can be determined since the vehicle body acceleration which the vehicle body acceleration sensor outputs largely fluctuates. When the vehicle ascends or descends a slope having a large inclination, there is no possibility that the output fixing trouble is erroneously detected in spite of the fact that the vehicle body acceleration sensor is normal and, at the same time, it is possible to accurately detect the output fixing trouble of the vehicle body acceleration sensor even in a state that the vehicle body acceleration which acts on the vehicle body is small.

According to a sixth aspect of the present invention, the trouble diagnosis device of the vehicle body acceleration sensor described in any one of the above-mentioned first to fifth aspects of the present invention is incorporated in a control device which performs an antilock brake control. In a vehicle-use antilock brake system which includes the control device, a liquid pressure control unit which performs a control of a braking force based on a brake signal outputted from the control device, and a brake device which is operated upon receiving an output from the liquid pressure control unit, it is possible to obtain the manner of operation and advantageous effects of the invention described in any one of the above-mentioned first to fifth aspects in the vehicle-use antilock brake system.

BEST MODE FOR CARRYING OUT THE INVENTION

Hereinafter, modes for carrying out the present invention are explained in conjunction with drawings.

FIG. 1 is a schematic block diagram which shows the system constitution of a vehicle-use ABS according to the present invention which includes a vehicle body acceleration sensor. The basic constitution of a vehicle-use ABS is constituted of a wheel speed sensor 4 which is used as a "vehicle speed detection means", an ECU 2 which is used as a "trouble diagnosis device of a vehicle body acceleration sensor" according to the present invention, and a liquid pressure unit 3. The wheel speed sensor 4 generates an AC signal having frequency proportional to a rotational speed of a wheel 41 by detecting teeth of a gear 42 which is rotated along with the wheel 41. The ECU 2 includes an arithmetic block 21 which is used as a "vehicle body acceleration-sensor output fluctuation-width arithmetic means" and a "vehicle body acceleration change width arithmetic means". The arithmetic block 21 has an arithmetic function, wherein the arithmetic block 21 calculates the wheel speed upon receiving an AC signal which is transmitted from the wheel speed sensor 4 as an input, and also calculates a slip factor, a wheel acceleration/deceleration and the like necessary for an antilock brake control based on the calculated wheel speed. Further, the arithmetic block 21, as an vehicle body acceleration arithmetic means, calculates the vehicle body acceleration (logical vehicle body acceleration described later) based on an output signal of the wheel speed sensor 4 (vehicle speed detection means).

The ECU 2 includes a control block 22 having an antilock brake control function which receives the slip factor and the wheel acceleration/deceleration which are calculated by the arithmetic block 21 as an input, generates a control command with respect to a brake pressure by logically combining the inputted slip factor and the wheel acceleration/deceleration and transmits the control command to the liquid pressure unit 3. The ECU 2 includes a monitor block 23 having a system monitor function which performs a function check and the monitoring of respective constitutional parts and the whole system, wherein when a defect is found in the above-mentioned parts and system, the monitor block 23 alarms a driver using an alarm lamp 5, an alarm buzzer not shown in the drawings or the like and, further, stops the antilock brake control function and, at the same time, allows a normal brake operation.

The liquid pressure unit 3 is arranged between a master cylinder 6 and a wheel cylinder 44. The liquid pressure unit 3 receives the control command from the ECU 2 and increases and decreases the brake pressure directly or in directly by driving a solenoid valve 31, a pump, a motor and the like not shown in the drawings independently from the increase or the decrease of the brake pressure to the brake disc 43 based on a step-in force to the brake pedal 7. The vehicle body acceleration sensor 1 is a sensor which detects the acceleration in the advancing direction of the vehicle. The vehicle body acceleration which is outputted from the vehicle body acceleration sensor 1 is inputted to the arithmetic block 21 of the ECU 2, wherein when the deceleration detected by the vehicle body acceleration sensor 1 is smaller than a fixed value, the arithmetic block 21 determines that a road surface state is a low μ road surface. Further, the control block 22 enhances the control accuracy by changing over a slip logic control from the high-μ-road-surface-use slip control logic to the low-μ-road-surface-use slip control logic thus preventing the wheel 41 from being locked. Further, a trouble of the vehicle body acceleration sensor 1 is monitored (diagnosed) by a monitor block 23. Further, in this embodiment, the vehicle body acceleration sensor 1 is formed of an analogue-type G sensor. The analogue-type G sensor is constituted of an electronic circuit which makes use of a Hall element and is capable of detecting and outputting the acceleration in the longitudinal direction which acts on the vehicle body with fine steps. Here, the vehicle body acceleration sensor 1 is not particularly limited to the analogue-type G sensor and the present invention can be carried out even when the vehicle body acceleration sensor 1 of other type is adopted.

Next, the first embodiment of steps for detecting the output fixing trouble of the vehicle body acceleration sensor 1 in the ECU 2 which is used as the "trouble diagnosis device of a vehicle body acceleration sensor" is explained in conjunction with FIG. 2 to FIG. 6.

FIG. 2 is a flowchart showing a first embodiment of steps which define timing for executing the detection of the output fixing trouble of the vehicle body acceleration sensor 1. Here, the steps are steps which are executed repeatedly at a fixed cycle during a period in which the power source of the vehicle is supplied.

First of all, the ECU 2 determines whether an output fixing trouble detection stop flag is set to ON or not (step S1). This output fixing trouble detection stop flag is a flag for selecting whether a step which detects the output fixing trouble of the vehicle body acceleration sensor 1 described later is executed or oat. The detection of output fixing trouble of the vehicle body acceleration sensor 1 is executed only during a period in which the output fixing trouble detection stop flag is set to OFF, and the detection of the output fixing trouble of the vehicle body Acceleration sensor 1 is not executed during a period in which the flag is set to ON. When the output fixing trouble detection stop flag is set to OFF (No in step S1), subsequently, the ECU 2 determines whether the vehicle speed is equal to or more than a preset speed y which constitutes "a predetermined speed" or not (step S2). In this embodiment, the preset speed y is set to approximately 4 m/s. It is preferable that the preset speed y is set to a speed as low as possible. By setting the preset speed to such a speed, when the output fixing trouble of the vehicle body acceleration sensor 1 occurs, it is possible to detect the output fixing trouble immediately after starting the traveling of the vehicle. When the vehicle speed is less than the preset speed y (No in step S2), the ECU 2 determines that the vehicle is in a stopped state and finishes the step as it is. When the vehicle speed is equal to or more than the preset speed y (Yes in step S2), the ECU 2 determines that the vehicle is traveling and, subsequently, determines whether a fluctuation width of the output value of the vehicle body acceleration sensor 1 (G sensor) is equal to or more than a preset fluctuation width 6 which constitutes "a predetermined value of the output fluctuation width of the vehicle body acceleration sensor" or not (step S3). In this embodiment, the preset fluctuation width 8 is set to approximately 0.59 m/s². It is preferable that the preset fluctuation width 6 is a fluctuation width which is sufficiently larger than the fluctuation of the output value attributed to the voltage fluctuation of the power source voltage of the vehicle body acceleration sensor I and, at the same time, is set to a fluctuation width as small as possible. Bu setting the preset fluctuation width δ to such a fluctuation width, there is no possibility that the output fixing trouble of the vehicle body acceleration sensor 1 is overlooked and, at the same time, time for executing the detection of the output fixing trouble of the vehicle body acceleration sensor 1 during traveling can be shortened to a minimum.

When the fluctuation width of the output value of the vehicle body acceleration sensor 1 (G sensor) is less than the preset fluctuation width δ (No in step S3), that is, when the ECU 2 cannot confirm that the output value of the vehicle body acceleration sensor 1 is clearly fluctuated, there is a possibility that the output fixing trouble of the vehicle body acceleration sensor 1 occurs and hence, the ECU 2 finishes the step without setting the above-mentioned output fixing trouble detection stop flag to ON. On the other hand, when the fluctuation width of the output value of the vehicle body acceleration sensor 1 (G sensor) is equal to or more than the preset fluctuation width δ (Yes in step S3), provided that the ECU 2 can confirm that the output value of the vehicle body acceleration sensor 1 is clearly fluctuated, the ECU 2 determines that the vehicle body acceleration sensor 1 is in a state with no output fixing trouble and hence, it is unnecessary to detect the output fixing trouble, and finishes the step by setting the above-mentioned output fixing trouble detection stop flag to ON (step S4). Further, when the output fixing trouble detection stop flag is set to ON (No in step S1), the ECU 2 determines whether the vehicle speed is equal to or more than a preset speed γ or not (step S5). When the vehicle speed is equal to or more than the preset speed γ (Yes in step S5), the ECU 2 determines that the vehicle is traveling, and finishes the steps while keeping the output fixing trouble detection stop flag to ON. When the vehicle speed is lowered to a value less than the preset speed γ (No in step S5), the ECU 2 determines that the vehicle is in a stopped state and finishes the steps by setting the above-mentioned output fixing trouble detection stop flag to. OFF (step S6).

FIG. 3 and FIG. 4 are timing charts of a first embodiment showing timing of the detection of the output fixing trouble of the vehicle body acceleration sensor 1.

When the power source of switch of the vehicle is turned on by a driver, an electric power is supplied to respective parts of the vehicle and hence, a control of the vehicle by the ECU 2 is started and, at the same time, the vehicle body acceleration sensor 1 and other respective sensors also start functions thereof (timing indicated by symbol S). An output voltage of the vehicle body acceleration sensor 1 is elevated to approximately 2.3V which is the output voltage in a state the acceleration is 0 from the 0V. Then, after a lapse of time (approximately 0.5 seconds) indicated by a symbol TS, the output value of the vehicle body acceleration sensor 1 becomes stable thus providing a state in which the vehicle body acceleration of the vehicle can be detected. An engine is started by the driver, and when the traveling of the vehicle is started, the vehicle speed is elevated and the output voltage of the vehicle body acceleration sensor 1 is fluctuated in response to the vehicle body acceleration which acts on the vehicle. At a point of time that the vehicle speed becomes the preset speed γ (4 m/s) or more (timing indicated by symbol T1), the storing and the updating of the maximum value Gmax and the minimum value Gmin of the output value of the vehicle body acceleration sensor 1 are started, and it is determined whether the difference between the maximum value Gmax and the minimum value Gmin, that is, the fluctuation width of the output value of the vehicle body acceleration sensor 1 becomes the preset fluctuation width δ or more or not. Further, at a point of time that the fluctuation width of the output value of the vehicle body acceleration sensor 1 becomes the preset fluctuation width δ or more, the output fixing trouble detection stop flag of the vehicle body acceleration sensor 1 is changed over from OFF to ON and hence, the detection of the output fixing trouble of the vehicle body acceleration sensor 1 is not performed (timing indicated by symbol T2). Further, at a point of time that the vehicle speed assumes a value equal to or less than the preset speed γ (4 m/s) (timing indicated by symbol T3), the output fixing trouble detection stop flag of the vehicle body acceleration sensor 1 is changed over from ON to OFF and, at the same time, the maximum value Gmax and the minimum value Gmin which are temporarily stored are cleared and, thereafter, the storing and the updating of the maximum value Gmax and the minimum value Gmin of the output value of the vehicle body acceleration sensor 1 are performed. Accordingly, the detection of the output fixing trouble of the vehicle body acceleration sensor 1 is performed only during the period in which the output fixing trouble detection stop flag assumes the OFF state. Accordingly, the processing load of the ECU 2 attributed to the detection of the output fixing trouble of the vehicle body acceleration sensor 1 can be reduced.

FIG. 5 is a timing chart showing the timing of output fixing trouble detection of the vehicle body acceleration sensor 1.

A curve indicated by symbol A is a logical vehicle body acceleration curve which indicates the vehicle body acceleration calculated based on the wheel speed (logical vehicle body acceleration). A curve indicated by symbol B is a physical vehicle body acceleration curve which indicates the vehicle body acceleration detected by the vehicle body acceleration sensor 1 (physical vehicle body acceleration). Further, a broken-line curve indicated by symbol Amax is, as shown in the drawing, a vehicle body acceleration curve which is obtained by adding a preset value α to the logical vehicle body acceleration curve and, a broken-line curve indicated by symbol Amin is, as shown in the drawing, a vehicle body acceleration curve which is obtained by subtracting the preset value α from the logical vehicle body acceleration curve. Here, the preset value α is, so long as the vehicle body acceleration sensor 1 functions normally, set to a maximum value of the relative acceleration difference between the logical vehicle body acceleration curve and the physical vehicle body acceleration curve which may be continuously generated and values which are obtained by an experiment or the like. It is preferable to set this preset value α to a value as small as possible within a range which can prevent the erroneous detection of the output fixing trouble thus realizing the detection of the output fixing trouble with high sensitivity. Accordingly, in a state that the physical vehicle body acceleration curve progresses in a region between the vehicle body acceleration curve Amax and the vehicle body acceleration curve Amin, the detection of the output fixing trouble of the vehicle body acceleration sensor 1 is not performed. Here, in this embodiment, the preset value α is set to approximately 1.47 m/s$^2$. Further, not shown in the drawing, the curves of the above-mentioned vehicle body accelerations are curves obtained on a plane in which the vehicle body acceleration is taken on an axis of abscissas and a time axis is taken on an axis of ordinates.

A fail counter counts the continuation time in which the physical vehicle body acceleration curve continuously progresses outsides a region between the vehicle body acceleration curve Amax and the vehicle body acceleration curve Amin. That is, the fail counter measures the continuation time in which the relative acceleration difference between the logical vehicle body acceleration curve and the physical vehicle body acceleration curve exceeds the preset value α. Further, during the period in which the fail counter counts the continuation time in which the above-mentioned relative acceleration difference exceeds the preset value α, a temporary trouble detection flag is set. This temporary trouble detection flag indicates that the above-mentioned relative acceleration difference exceeds the preset value α and implies that the above-mentioned relative acceleration difference which exhibits the possibility of the occurrence of the output fixing trouble in the vehicle body acceleration sensor 1 is generated.

Accordingly, at a point of time that the temporary trouble detection flag is established, the determination that the vehicle body acceleration sensor 1 is in the output fixing trouble is not yet made. Further, when the continuation time in which the above-mentioned relative acceleration difference exceeds the preset value α is equal to or less than a preset time, the temporary trouble detection flag is reset. Here, the preset time is, so long as the vehicle body acceleration sensor 1 normally functions, set to time longer than time in which there exists a possibility that the relative acceleration difference between the logical vehicle body acceleration curve and the physical vehicle body acceleration curve continuously exceeds the preset value α, and is obtained based on an experiment or the like. That is, as indicated by symbol F1, when the continuation time in which the above-mentioned relative acceleration difference exceeds the preset value α is equal to or less than 1 second which is the preset time, for example, it is judged that the vehicle body acceleration acts strongly on the vehicle body momentarily due to stepped portions of a road surface or the like, and the temporary trouble detection flag is reset and the detection processing of the output fixing trouble is continued.

On the other hand, when the continuation time in which the above-mentioned relative acceleration difference exceeds the preset value α exceeds the preset time, the fail counter calculates by an arithmetic operation the difference between the maximum value and the minimum value of the physical vehicle body acceleration during a period in which the above-mentioned relative acceleration difference exceeds the preset value α and compares the difference with a preset value β. Here, the preset value β is a value which is set to the maximum value of the acceleration fluctuation width which the vehicle body acceleration sensor 1 can output in a state that the vehicle body acceleration sensor 1 is in the output fixing trouble and is obtained by an experiment or the like. That is, as indicated by symbol F2, at a point of time that the continuation time in which the above-mentioned relative acceleration difference exceeds the preset value α elapses one second which is the preset time, the ECU 2 determines whether the above-mentioned relative acceleration difference which exceeds the preset value α is attributed to the output fixing trouble of the vehicle body acceleration sensor 1 or not. Here, in this embodiment, the preset value β is set to approximately 0.98 m/s². Further, the preset time is preferably as short as possible within a range in which there is no possibility of the erroneous detection of the output fixing trouble. This is because that the output fixing trouble can be detected with a shorter time. Further, the preset value β is preferably as small as possible within a range in which there is no possibility of the erroneous detection of the output fixing trouble. This is because that the output fixing trouble can be detected with high accuracy. Here, in this embodiment, the preset time is set to approximately 1 second.

Then, when the difference between the maximum value and the minimum value of the above-mentioned physical vehicle body acceleration is equal to or less than the preset value β, the ECU 2 determines that the trouble is the output fixing trouble in which the output of the vehicle body acceleration sensor 1 is fixed without being fluctuated and establishes a trouble detection flag while resetting the temporary trouble detection flag. At a point of time that the ECU 2 determines the output fixing trouble and establishes the trouble flag, the alarm lamp 5 in a cabin is turned on and, at the same time, an antilock brake control function is stopped thus allowing the normal brake operation. Further, a trouble code of the output fixing trouble of the vehicle body acceleration sensor 1 is stored in a non-volatile storing medium not shown in the drawing. On the other hand, as expressed by a broken line which is indicated by symbol C, when the difference between the maximum value and minimum value of the above-mentioned physical vehicle body acceleration exceeds the preset value β, the ECU 2 determines that this phenomenon is attributed to the fluctuation of the vehicle body acceleration which acts on the vehicle body due to gravity when the vehicle ascends or descends a slope having a large inclination angle, for example, and the trouble detection flag is not established. Further, the detection processing of the output fixing trouble is interrupted by resetting the temporary trouble detection flag.

FIG. 6 is a flowchart showing steps which detect the output fixing trouble of the vehicle body acceleration sensor 1. Here, the steps are steps which are executed repeatedly at a fixed cycle during a period in which the power source of the vehicle is supplied.

First of all, the ECU 2 determines whether the output fixing trouble detection stop flag of the above-mentioned vehicle body acceleration sensor 1 is set to ON or not (step S11). When the output fixing trouble detection stop flag of the vehicle body acceleration sensor 1 is set to ON (Yes in step S11), the step is finished as it is and hence, the detection of the output fixing trouble of the vehicle body acceleration sensor 1 is not performed. On the other hand, when the output fixing trouble detection stop flag of the vehicle body acceleration sensor 1 is set to OFF (No in step S11), the ECU 2 subsequently determines whether the antilock brake control is executed with respect to the brake system or not (step S12). When the antilock brake control is underway (No in step S12), the output fixing trouble detection of the vehicle body acceleration sensor 1 is not performed. On the other hand, when the antilock brake control is not underway (Yes in step S12), the ECU 2 subsequently determines whether the vehicle is traveling at a fixed speed or more or not (step S13). When the vehicle is not traveling at the fixed speed or more, that is, when the vehicle is stopped (No in step S13), the output fixing trouble detection of the vehicle body acceleration sensor 1 is not performed. On the other hand, when the vehicle is traveling at the fixed speed or more (Yes in step S13), the output fixing trouble detection of the vehicle body acceleration sensor 1 is performed.

Subsequently, the relative difference between the logical vehicle body acceleration which is calculated based on the wheel speed and the physical vehicle body acceleration which is outputted from the vehicle body acceleration sensor 1 is obtained and the difference is compared with the above-mentioned preset value α (step S14). When an absolute value of the difference between the logical vehicle body acceleration and the physical vehicle body acceleration is equal to or less than the preset value α (No in step S14), the vehicle body acceleration sensor 1 is considered normal, while when the absolute value exceeds the preset value a (Yes in step S14), the above-mentioned temporary trouble detection flag is established at this point of time, and the fail counter starts a count-up operation (step S15). Further, the fail counter stores the minimum value and the maximum value of the physical vehicle body acceleration while always updating these values from a point of time that a count-up operation of the fail counter is started. Then, when the value of the fail counter during a period in which the absolute value of the difference between the logical vehicle body acceleration and the physical vehicle body acceleration exceeds the preset value α is equal to or less than 1 second (No in step S15), as mentioned previously, the ECU 2 determines that the strong vehicle body acceleration momentarily acts on the vehicle body and resets the temporary trouble detection flag.

On the other hand, when the value of the fail counter during a period in which the absolute value of the difference between the logical vehicle body acceleration and the physical vehicle body acceleration exceeds the preset value α exceeds 1 second (Yes in step S15), the ECU 2 subsequently acquires the stored maximum value and the minimum value of the physical vehicle body acceleration during that period (step S16) calculates the difference between these values by the arithmetic operation, and compares the difference with the above-mention preset value β (step S17). When the difference between the maximum value and the minimum value is equal to or more than the preset value β (No in step S17), as mentioned previously, the ECU 2 determines that this phenomenon is attributed to the fluctuation of the vehicle body acceleration which acts on the vehicle body due to gravity when the vehicle descends or ascends a slope having a large inclination angle, for example, and the output fixing trouble detection flag of the vehicle body acceleration sensor 1 is not established. Further, the temporary trouble detection flag is reset and the output fixing trouble detection processing is interrupted (step S18). Then, when the difference between the maximum value and the minimum value is less than the preset value β (Yes in step S17), the ECU 2 determines that the trouble is the output fixing trouble in which the output of the vehicle body acceleration sensor 1 is fixed without being fluctuated, and establishes the output fixing trouble detection flag (step S19) while resetting the temporary trouble detection flag. Accordingly, there is no possibility that the output fixing trouble is detected erroneously in spite of the fact that the vehicle body acceleration sensor 1 is normal when the vehicle ascends or descend the slope having a large inclination and, at the same time, the ECU 2 can accurately detect the output fixing trouble of the vehicle body acceleration sensor 1 even in a state that the vehicle body acceleration which acts on the vehicle body is small.

In this manner, it is possible to reduce the processing load of the ECU 2 (vehicle control device) attributed to the output fixing trouble detection of the sensor which is mounted on the vehicle and whose output is changed corresponding to the traveling state of the vehicle during the traveling of the vehicle, particularly the vehicle body acceleration sensor 1 which detects the vehicle body acceleration of the vehicle.

Subsequently, the second embodiment of the manner of operation for detecting the output fixing trouble of the vehicle body acceleration sensor 1 is explained in conjunction with FIG. 7 and FIG. 8. FIG. 7 is a flowchart showing a second embodiment of steps which define timing for executing the detection of the output fixing trouble of the vehicle body acceleration sensor 1. Here, the steps are steps which are executed repeatedly at a fixed cycle during a period in which the power source of the vehicle is supplied.

The steps described in this embodiment are, in the first embodiment of the steps which defines the timing for executing the output fixing trouble detection of the above-mentioned vehicle body acceleration sensor 1, characterized in that, during the traveling of the vehicle, the ECU 2 sets the output fixing trouble detection stop flag to OFF after a lapse of every predetermined time and determines whether the detection of the output fixing trouble of the vehicle body acceleration sensor 1 is executed or not. Since steps S21 to S24 are substantially equal to steps S1 to S4 of the flowchart shown in FIG. 2 and their explanation is omitted. When the output fixing trouble detection stop flag is set to ON (No in step 25), the ECU 2 determines whether the vehicle speed is the preset speed γ or more or not (step S25), and when the vehicle speed is lower than the preset speed γ (No in step S25) the ECU 2 determines that the vehicle is in a stopped state and sets the output fixing trouble detection stop flag to OFF and finishes the steps (step S26). On the other hand, when the vehicle speed is equal to or more than the preset speed γ (Yes in step S25), the ECU 2 subsequently determines whether the predetermined time elapses from a point of time that the output fixing trouble detection stop flag is changed over from OFF to ON (step S27). When the predetermined time is not yet elapses from the point of time that the output fixing trouble detection stop flag is changed over from OFF to ON (No in step S27), the ECU 2 finishes the step while maintaining the output fixing trouble detection stop flag in the ON state. Then, when the predetermined time elapses from the point of time that the output fixing trouble detection stop flag is changed over from OFF to ON (Yes in step S27), the output fixing trouble detection stop flag is changed over from ON to OFF and the step is finished (step S26).

FIG. 8 is a second embodiment of a timing chart showing the timing at which the output fixing trouble of the vehicle body acceleration sensor 1 is detected.

At a point of time that the fluctuation width of the output value of the vehicle body acceleration sensor 1 becomes the preset fluctuation width δ or more during the traveling of the vehicle, the output fixing trouble detection stop flag of the vehicle body acceleration sensor 1 is changed over from OFF to ON and hence, the detection of the output fixing trouble of the vehicle body acceleration sensor 1 is not performed (timing indicated by symbol T4). Counting of time using timer from a point of time that the output fixing trouble detection stop flag is changed over from OFF to ON is performed, and at a point of time that a lapsed time from the point of time that the output fixing trouble detection stop flag is changed over from OFF to ON while maintaining the vehicle speed at a preset speed γ or more becomes a predetermined time (time indicated by symbol TR) or more, the storing and the updating of the maximum value Gmax and the minimum value Gmin are reset and the temporarily stored maximum value Gmax and the minimum value Gmin are cleared (timing indicated by symbol T5) When the maximum value Gmax and the minimum value Gmin are cleared temporarily, the difference between the maximum value Gmax and the minimum value Gmin of the output value of the vehicle body acceleration sensor 1 assumes a value less than the preset fluctuation width δ and hence, the output fixing trouble detection stop flag is changed over from ON to OFF. From this point of time, the storing and the updating of the maximum value Gmax and the minimum value Gmin of the output value of the vehicle body acceleration sensor 1 are again started and the ECU 2 determines whether the difference between the maximum value Gmax and the minimum value Gmin, that is, the fluctuation width of the output value of the vehicle body acceleration sensor 1 becomes equal to or more than the preset fluctuation width δ or not. Further, at the point of time that the fluctuation width of the output value of the vehicle body acceleration sensor 1 again becomes equal to or more than the preset fluctuation width δ, the output fixing trouble detection stop flag of the vehicle body acceleration sensor 1 is changed over from OFF to ON and hence, the detection of the output fixing trouble of the vehicle body acceleration sensor 1 is not performed and, at the same time, the counting of time using the timer is started (timing indicated by symbol T6). In this manner, during the period in which the vehicle travels with the preset speed γ or more, the ECU 2 can perform the detection of the output fixing trouble of the vehicle body acceleration sensor 1 for every predetermined time.

Further, as a third embodiment of the steps which define timing for executing the output fixing trouble detection of the vehicle body acceleration sensor 1, it maybe possible to provide a technique in which, in the above-mentioned first embodiment or second embodiment, even when the fluctuation width of the output value of the vehicle body acceleration sensor 1 becomes the preset fluctuation width δ or more during the period in which the vehicle speed is less than the preset speed γ, the subsequent output fixing trouble detection of the vehicle body acceleration sensor 1 is not performed. There may be a case that even in a state that the vehicle is stopped, the output value of the vehicle body acceleration sensor 1 is fluctuated due to the getting on and off of passengers into the vehicle and the fluctuation width becomes equal to or more than the preset fluctuation width δ. Accordingly, it is possible to allow the ECU 2 to determine that the output fixing trouble of the vehicle body acceleration sensor 1 is not generated even when the fluctuation width of the output value of the vehicle body acceleration sensor 1 becomes to equal to or more than the preset fluctuation width δ during the period in which the vehicle speed is less than the preset speed γ, that is, during the period in which the vehicle is substantially stopped. Due to such a constitution, it is possible to more speedily detect that the output fixing trouble of the vehicle body acceleration sensor 1 is not generated and hence, the detection of the output fixing trouble of the vehicle body acceleration sensor 1 before starting the traveling of the vehicle can be prevented whereby the processing load of the ECU 2 during the traveling of the vehicle can be reduced.

Subsequently, the third embodiment of the manner of operation for detecting the output fixing trouble of the vehicle body acceleration sensor 1 is explained in conjunction with FIG. 9 to FIG. 11.

FIG. 9 is a flowchart showing a third embodiment of steps which define timing for executing the detection of the output fixing trouble of the vehicle body acceleration sensor 1. Here, the steps are steps which are executed repeatedly at a fixed cycle during a period in which the power source of the vehicle is supplied.

First of all, the ECU 2 determines whether the fluctuation width of the output value of the vehicle body acceleration sensor 1 (G sensor) is equal to or more than the preset fluctuation width δ or not (step S31). The preset fluctuation width δ is set to approximately 0.59 m/S$^2$ in this embodiment. The preset fluctuation width δ is preferably set to a fluctuation width which is sufficiently larger than the fluctuation of the output value attributed to the voltage fluctuation of the power source voltage of the vehicle body acceleration sensor 1 and, at the same time, is set as small as possible. By setting the preset fluctuation width δ to such a value, there is no possibility that the output fixing trouble of the vehicle body acceleration sensor 1 is overlooked and, at the same time, time for executing the detection of the output fixing trouble of the vehicle body acceleration sensor 1 during traveling can be shortened to a minimum. When the fluctuation width of the output value of the vehicle body acceleration sensor 1 (G sensor) is equal to or more than the preset fluctuation width δ (Yes in step S31), provided that the clear fluctuation of the output value of the vehicle body acceleration sensor 1 is confirmed, this implies that the output fixing trouble of the vehicle body acceleration sensor 1 is not generated and hence, ECU 2 determines that the detection of the output fixing trouble is unnecessary and sets the above-mentioned output fixing trouble detection stop flag to ON (step S32). On the other hand, when the fluctuation width of the output value of the vehicle body acceleration sensor 1 (G sensor) is less than the preset fluctuation width δ (No in step S31), that is, when the clear fluctuation of the output value of the vehicle body acceleration sensor 1 is not confirmed, there exists a possibility that the output fixing trouble of the vehicle body acceleration sensor 1 is generated and hence, the ECU 2 subsequently determines whether the vehicle speed is equal to or less than a preset speed ε or not (step S33) without setting the above-mentioned output fixing trouble detection stop flag to ON. The above-mentioned preset speed γ and the preset speed ε have the relationship of ε<γ, wherein in this embodiment, the preset speed γ is set to approximately 4 m/s and the preset speed ε is set to approximately 0.5 m/s. When the vehicle speed is equal to or more than the preset speed ε (No in step S33), the ECU 2 subsequently determines whether the vehicle speed is equal to or more than the preset speed γ or not (step S34). When the vehicle speed is less than the preset speed γ (No in step S34), the step is finished as it is, while when the vehicle speed is equal to or more than the preset speed γ (Yes in step S34), the ECU 2 determines that the vehicle is traveling and sets the vehicle traveling confirmation flag to ON (step S35). On the other hand, when the vehicle speed is equal to or less than the preset speed ε (Yes in step S33), the ECU 2 determines that the vehicle is stopped and subsequently determines whether the vehicle traveling confirmation flag is OFF or not (step S36) When the vehicle traveling confirmation flag is OFF (Yes in step S36), the step is finished as it is, while when the vehicle traveling confirmation flag is ON (No in step S36), the ECU 2 determines that the vehicle is stopped after traveling at the preset speed γ or more (the vehicle speed is lowered to a value equal to or less than the preset speed ε), and sets the vehicle traveling confirmation flag and the output fixing trouble detection stop flag to OFF (step S37) and finishes the step.

FIG. 10 and FIG. 11 are a first embodiment of a timing chart showing the timing which detects the output fixing trouble of the vehicle body acceleration sensor 1.

When a power switch of vehicle is turned on by a driver, electricity is supplied to respective parts of the vehicle and hence, the ECU 2 starts the control of the vehicle and, at the same time, the vehicle body acceleration sensor 1 and other sensors also start to function (at timing indicated by symbol S). The output voltage of the vehicle body acceleration sensor 1 is elevated to approximately 2.3V which constitutes the output voltage in a state that the acceleration is 0 from 0V, and the output value of the vehicle body acceleration sensor 1 becomes stable after a lapse of time indicated by symbol TS (approximately 0.5 seconds) thus assuming a state in which the vehicle body acceleration sensor 1 can detect the vehicle body acceleration of the vehicle. From this point of time (timing indicated by symbol T1), the storing and the updating of the maximum value Gmax and the minimum value Gmin of the output value of the vehicle body acceleration sensor 1 are started, and the ECU 2 determines whether the difference between the maximum value Gmax and the minimum value Gmin, that is the fluctuation width of the output value of the vehicle body acceleration sensor 1 becomes equal to or more than the preset fluctuation width δ or not. When the engine is started by the driver and the traveling of the vehicle is started, the vehicle speed is elevated. At a point of time that the vehicle speed becomes the preset speed γ (4 m/s) or more, the vehicle traveling confirmation flag is changed over from OFF to ON. Then, at a point of time that the fluctuation width of the output value of the vehicle body acceleration sensor 1 becomes the preset fluctuation width δ or more, the output fixing trouble detection stop flag of the vehicle body acceleration sensor 1 is changed over from OFF to ON and hence, the detection of the output fixing trouble of the vehicle body acceleration sensor 1 is not performed (timing indicated by symbol T2).

Further, at a point of time that the vehicle speed becomes equal to or less than the preset speed ε (0.5 m/s) (timing indicated by symbol T3), the vehicle traveling confirmation flag is changed over from ON to OFF and the output fixing trouble detection stop flag of the vehicle body acceleration sensor 1 is changed over from ON to OFF. When the output fixing trouble detection stop flag of the vehicle body acceleration sensor 1 is changed over from ON to OFF, the maximum value Gmax and the minimum value Gmin which are temporarily stored are cleared and, thereafter, the storing and the updating of the maximum value Gmax and the minimum value Gmin of the output value of the vehicle body acceleration sensor 1 are again performed. Accordingly, the detection of the output fixing trouble of the vehicle body acceleration sensor 1 is performed only during the period in which the output fixing trouble detection stop flag is set to OFF. Accordingly, the processing load of the ECU 2 attributed to the detection of the output fixing trouble of the vehicle body acceleration sensor 1 can be reduced.

Here, it is needless to say that the present invention is not limited to the above-mentioned embodiments and various modifications are conceivable and these modifications also fall within the scope of the present invention. Further, an object from which the output fixing trouble is detected is not particularly limited to the vehicle body acceleration sensor 1 and, for example, such an object may be a yaw rate sensor which detects a rotational speed of the vehicle, a steering angle sensor which generates rotational angle information of the steering wheel or the like, and even in modes in which these sensors constitute objects from which the output fixing trouble is detected, it is possible to obtain the manner of operation and advantageous effect of the present invention.

INDUSTRIAL APPLICABILITY

The present invention is applicable to a sensor which is mounted on the vehicle and is changed corresponding to the traveling state of the vehicle during the traveling of the vehicle, particularly the vehicle control device which executes the control of the vehicle based on the output signal from the vehicle body acceleration sensor which detects the vehicle body acceleration of the vehicle, and the antilock brake control device, wherein it is possible to obtain the manner of operation and advantageous effects in such vehicle control device and antilock brake control device.

BRIEF EXPLANATION OF DRAWINGS

FIG. 1 A schematic block diagram showing the system constitution of a vehicle-use ABS.

FIG. 2 A first embodiment of steps which define timing for executing the fixing trouble detection.

FIG. 3 A timing chart showing timing for detecting a fixing trouble.

FIG. 4 A timing chart showing timing for detecting a fixing trouble.

FIG. 5 A timing chart of the fixing trouble detection of a vehicle body acceleration sensor.

FIG. 6 A flowchart showing steps for detecting the fixing trouble of a vehicle body acceleration sensor.

FIG. 7 A second embodiment of steps which define timing for executing the fixing trouble detection.

FIG. 8 A timing chart showing timing for detecting a fixing trouble.

FIG. 9 A third embodiment of steps which define timing for executing the fixing trouble detection.

FIG. 10 A timing chart showing timing for detecting a fixing trouble.

FIG. 11 A timing chart showing timing for detecting a fixing trouble.

The invention claimed is:

1. A trouble diagnosis device of a vehicle body acceleration sensor which performs a trouble diagnosis of the vehicle body acceleration sensor based on the vehicle body acceleration sensor which is mounted on a vehicle, a vehicle speed detection means which detects a speed of the vehicle, and a vehicle body acceleration sensor output fluctuation width arithmetic means which calculates an output fluctuation width of the vehicle body acceleration sensor, wherein
the trouble diagnosis device by determining that an output fixing trouble of the vehicle body acceleration sensor is not generated at a point of time that the output fluctuation width of the output value of the vehicle body acceleration sensor becomes a predetermined value or above during the traveling of the vehicle with the vehicle speed equal to or more than the predetermined speed, and by stopping the trouble diagnosis of the output fixing trouble of the vehicle body acceleration sensor until the vehicle speed is lowered to a value less than the predetermined speed avoids the unnecessary trouble diagnosis of the output fixing trouble of the vehicle body acceleration sensor, and
the trouble diagnosis device is operated until the vehicle speed which is detected by the vehicle speed detection means becomes equal to or more than a predetermined speed and the output fluctuation width of the vehicle body acceleration sensor which is calculated by the vehicle body acceleration sensor output fluctuation width arithmetic means becomes a predetermined value or more.

2. A trouble diagnosis device of a vehicle body acceleration sensor which performs a trouble diagnosis of a vehicle body acceleration sensor according to claim 1, wherein the trouble diagnosis device further includes a timer means, and the trouble diagnosis device is operated during a period in which a predetermined time passes from a point of time that, the output fluctuation width of the vehicle body acceleration sensor assumes a value equal to or more than the predetermined change width and, again, the output fluctuation width of the vehicle body acceleration sensor assumes a value equal to or more than the predetermined change width.

3. A trouble diagnosis device of a vehicle body acceleration sensor which performs a trouble diagnosis of a vehicle body acceleration sensor according to claim 1 or 2, wherein the trouble diagnosis device includes a storing and updating means which stores and updates a maximum value and a minimum value of an output value of the vehicle body acceleration sensor, and the trouble diagnosis device sets the difference between the stored maximum value and minimum value of the output value of the vehicle body acceleration sensor to the output fluctuation width of the vehicle body acceleration sensor.

4. A trouble diagnosis device of a vehicle body acceleration sensor which performs a trouble diagnosis of a vehicle body acceleration sensor according to claim 3, wherein the maximum value and the minimum value of the output value of the vehicle body acceleration sensor stored in the storing and updating means are reset at a point of time that the vehicle speed is lowered to a value less than the predetermined speed.

5. A trouble diagnosis device of a vehicle body acceleration sensor which performs a trouble diagnosis of a vehicle body acceleration sensor according to claim 1, wherein the trouble diagnosis device includes a vehicle body acceleration arithmetic means which calculates the vehicle body acceleration based on an output signal of the vehicle-speed detection means, and a comparison measuring means which measures a continuation time of a state in which the relative acceleration difference between a calculated value of the vehicle body acceleration arithmetic means and an output value of the vehicle body acceleration sensor output fluctuation width arithmetic means exceeds a preset value $\alpha$, wherein the trouble diagnosis device stores the maximum value and the minimum value of the output value of the vehicle body acceleration sensor during the period that the acceleration difference exceeds the preset value $\alpha$, and when the difference of the stored maximum value and minimum value of the output value of the vehicle body acceleration sensor at a point of time that the continuation time of the state in which the acceleration difference exceeds the preset value $\alpha$ exceeds a preset time is equal to or less than a preset value $\beta$, the trouble diagnosis device determines that the vehicle body acceleration sensor is in an output fixing trouble state.

6. A vehicle-use antilock brake system in which the trouble diagnosis device of a vehicle body acceleration sensor according to any one of claims 1 to 5 is incorporated in a control device which performs an antilock brake control, the vehicle-use antilock brake system comprising;

the control device;

a liquid pressure control unit which performs a control of a braking force based on a brake signal outputted from the control device; and a brake device which is operated upon receiving an output from the liquid pressure control unit.

* * * * *